United States Patent [19]

Roeder

[11] 4,403,922
[45] Sep. 13, 1983

[54] SEAL GLAND IMPROVEMENTS FOR HYDRAULICALLY ACTUATED DOWNHOLE PUMPS

[76] Inventor: George K. Roeder, P.O. Box 4335, Odessa, Tex. 79760

[21] Appl. No.: 191,673

[22] Filed: Sep. 29, 1980

[51] Int. Cl.³ .............................................. F16J 15/48
[52] U.S. Cl. ...................................... 417/358; 277/3; 277/343
[58] Field of Search .............. 417/358; 277/34.3, 34.6, 277/34, 3, 27

[56] References Cited

U.S. PATENT DOCUMENTS

| | | | |
|---|---|---|---|
| 2,164,195 | 6/1939 | Waltermire | 277/34.6 |
| 3,085,515 | 4/1963 | Workman | 417/511 |
| 3,304,872 | 2/1967 | English | 417/358 |
| 3,722,895 | 3/1973 | Mevissen | 277/34.3 |
| 4,244,590 | 1/1981 | Sanford | 277/34.3 |

FOREIGN PATENT DOCUMENTS 1918804 12/1970 Fed. Rep. of Germany ........ 277/34

Primary Examiner—Leonard E. Smith
Attorney, Agent, or Firm—Marcus L. Bates

[57] ABSTRACT

An improved seal assembly for sealing the annulus between a free-type downhole hydraulically actuated pump and the pump cavity within which the pump is telescopingly received downhole in a borehole. A connector body is affixed to the upper end of the pump, and a packer nose assembly is affixed to the upper end of the connector body. The connector body has a circumferentially extending groove formed thereabout, and a flow passageway wherein the connector body interconnects the interior of the hollow connector body to the inner wall surface of the groove. A resilient seal is received within the groove. The seal is quadrangular in cross-section. When the pump is seated downhole in the collar of the cavity, power fluid flows through the packer nose assembly, through the connector body, and to the hydraulic pump; while at the same time, power fluid flows into a working chamber formed between the innermost surface of the resilient seal and the bottom of the groove, thereby expanding the resilient seal outwardly into sealed engagement with the interior surface of the collar. This action precludes flow of power fluid between the pump housing and the collar, and at the same time, stabilizes the pump so that it is firmly held into operative position until the flow of power fluid is discontinued.

8 Claims, 7 Drawing Figures

SEAL GLAND IMPROVEMENTS FOR HYDRAULICALLY ACTUATED DOWNHOLE PUMPS

BACKGROUND OF THE INVENTION

Hydraulic pumps of the free-type are circulated downhole through a power oil string where the pump intake is seated on a shoe, so that formation fluid can flow through the seat and into the pump intake. At the same time, provision must be made so that power fluid does not flow between the interior of the power fluid string and the exterior of the pump housing. This is achieved by a pump cavity having a collar located therein, with there being seal means positioned between the pump housing and the collar, as seen for example in Roeder U.S. Pat. No. 4,088,328, to which reference is made, including the prior art cited therein.

Often a borehole extends vertically downhole and then is slanted back towards the horizontal. For example, directional drilling is usually employed on offshore platforms, and there may be more than 15 or 20 slanted boreholes associated with a single platform. When a free-type pump is circulated downhole in a slanted borehole, the downward travel causes excessive wear on the bottom side of the o-ring seals as the traveling pump rubs against the tubing interior, for the reason that the pump gravitates downwardly against the lower inside surface of the tubing string. Moreover, after the pump is seated into operative position, excessive wear continues on the lower side of the seal assembly, due to induced movement of the operating pump and gravitational force. Leakage of power fluid across a worn seal assembly progressively reduces the pump efficiency.

It would therefore be desirable to provide a free-type, downhole, hydraulically actuated pump with a seal assembly which is not subjected to wear during its travel into and out of the borehole, and which furthermore centralizes the pump within the pump cavity in a manner which reduces wear on the seals, as well as stabilizing the pump while the pump is in the seated position. A seal gland assembly which achieves this desirable goal is the subject of the present invention.

SUMMARY OF THE INVENTION

This invention is to an improved seal gland assembly for use in conjunction with free-type, downhole, hydraulically actuated pumps, by which the annular area between the pump housing and the pump cavity is sealed, or packed off, in an unusual manner, such that unexpected results flow from this new combination of elements. A connector body, made in accordance with this invention, interconnects the upper end of the pump assembly with the lower end of a packer nose assembly, so that the packer nose assembly aids in circulating the pump assembly into and out of the borehole, as well as providing a power fluid flow path therethrough. The connector body has a longitudinally extending axial passageway formed therethrough which provides fluid flow from the interior of the packer nose assembly to the pump engine valve intake. The connector body has an outer surface which is telescopingly received within the collar of the pump cavity.

A circumferentially extending, outwardly opening seal receiving groove is formed 360° about the exterior of the connector body. The groove has a bottom and opposed sidewalls. A flow port is formed from the bottom of the groove to the axial passageway of the connector body. This provides a source of power fluid for the seal.

A resilient seal element area, which is a quadrangle in cross-sectional, is received within the outwardly opening groove. The seal element includes opposed sides which are received in close tolerance relationship respective to the sides of the groove. The inner face of the seal element, in conjunction with the opposed sides and bottom of the groove, forms a working chamber so that when power fluid is effected within the axial passageway of the connector body, power fluid pressure is also effected within the working chamber, thereby biasing the seal element in an outward direction so that the outer surface of the seal element extends radially outward from the pump housing and engages the inner circumferentially extending surface of the collar. This action centralizes the upper end of the downhole pump, while a prior art shoe centralizes the lower end of the pump.

When the pressure differential is removed from across the seal element, the memory of the seal causes it to retract within the groove, whereupon the outer face of the seal element is spaced radially inwardly respective to the outermost surface of the connector body.

The configuration of the resilient seal includes an inwardly opening annular area which enlarges the working chamber and biases the opposed seal walls against the opposed walls of the groove.

Accordingly, a primary object of the present invention is the provision of improvements in a seal assembly by which the upper end of a downhole, hydraulically actuated pump assembly is sealed in such a manner that flow of power fluid between the pump housing and the pump cavity is precluded.

A further object of the present invention is the provision of a seal and centralizer in combination with a downhole, hydraulically actuated pump and a packer nose assembly.

Another object of the present invention is to provide one or more seal elements of various different configurations which will not abrade away as the pump is circulated into and out of a borehole.

A further object of this invention is the provision of a seal assembly improvement wherein a seal element thereof cooperates with a seal receiving groove thereof to provide a working chamber beneath the seal element, and wherein power fluid for the pump engine is used to force the seal radially outwardly against a seal collar, so that the seal is outwardly biased into sealed engagement with respect to the collar interior when power fluid is effected within the working chamber; and whereupon the seal elment retracts into the groove when the pressure differential across the seal element is removed, thereby protecting the seal element against abrasion as the pump is circulated into and out of a borehole.

Another and still further object of the present invention is the provision of a seal assembly for a free-type downhole hydraulically actuated pump which includes a seal element arranged to outwardly expand away from the pump housing and into sealed engagement with a collar when power fluid is applied to the pump, and which retracts into a protected location within the assembly during circulation of the pump into and out of the borehole.

Still another object of the invention is the provision of a seal assembly which provides a seal within the annulus between a downhole hydraulically actuated pump and a pump cavity.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Figure 1:
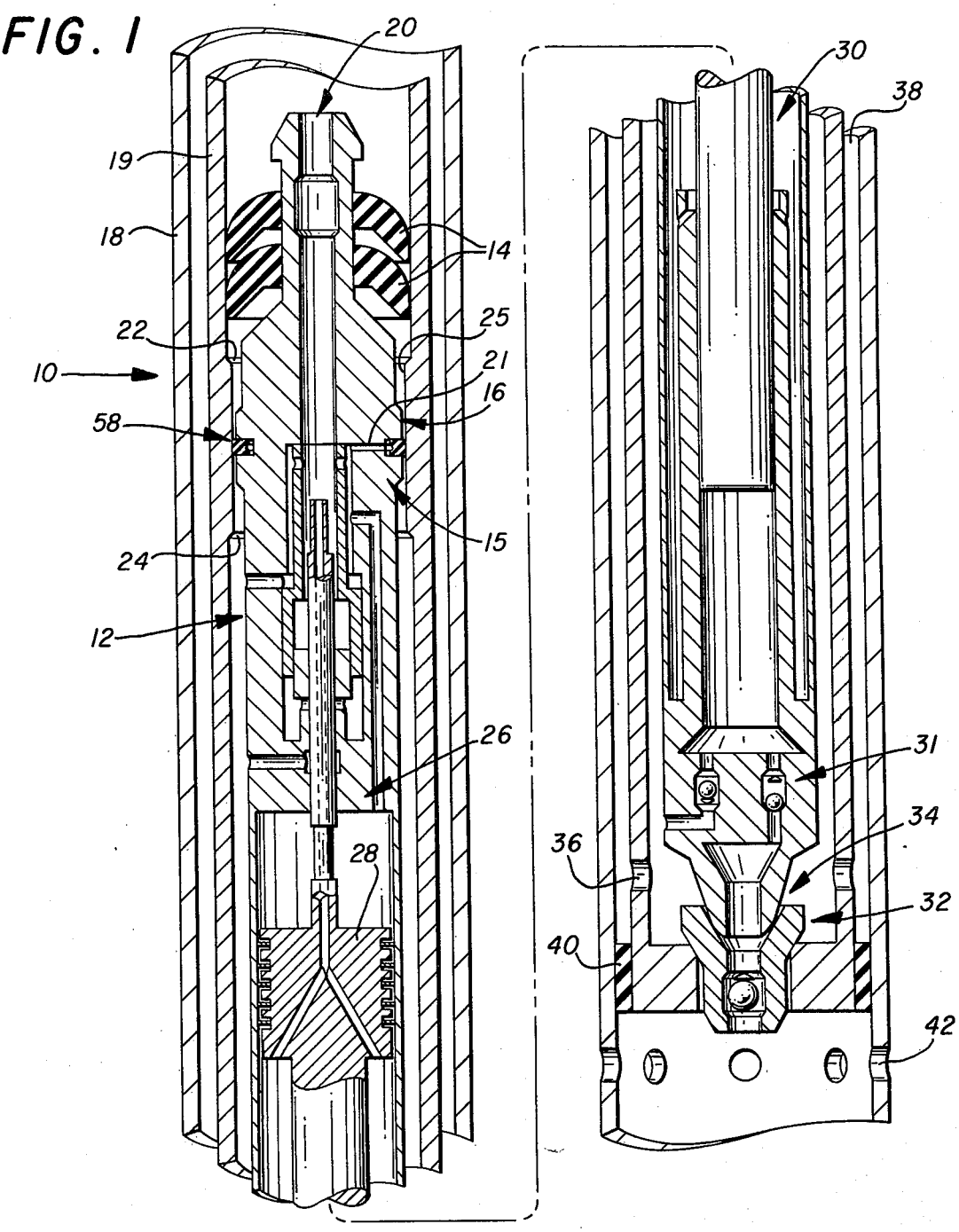
FIG. 1 is a fragmented, part cross-sectional view of part of a wellbore having a hydraulically actuated free-type pump operatively positioned therein, with the present invention being disclosed in conjunction with the pump.

In the figures of the drawings, and in particular FIG. 1, there is disclosed a wellbore 10 having a downhole hydraulically actuated pump 12 of the free-type located in operative relationship therewithin. The pump can take on several different forms. A packer nose assembly, having packer elements 14 attached thereto, is affixed to the upper end of the pump assembly.

An improved seal gland assembly 15, made in accordance with the present invention, connects the packer nose assembly to the upper end of the pump housing. The seal assembly includes a boss 16 which extends outwardly into close proximity of the illustrated pump cavity.

The wellbore includes a casing 18 within which there is disposed a power tubing 19. The illustrated free pump, which can take on several different forms, is received within the power tubing, and includes a power fluid inlet 20 formed at the top of the packer nose assembly to thereby provide a source of power fluid to the power fluid flow passageways 21 of the seal assembly of the present invention, and a source of power fluid for the engine valve assembly 26.

The lower marginal length of the power oil tubing is in the form of a pump cavity and includes a collar which extends from an upper end 22 to a lower end 24. The collar is aligned with the boss 16 of the seal assembly 15. The engine valve assembly 26 of the pump assembly actuates an engine piston 28 in a reciprocal manner, thereby reciprocatingly driving a pump piston 30, the details of which are known to those skilled in the art.

A prior art seating shoe 32 receives the lower inlet end 34 of the pump in seated relationship therewith. Production fluid outlet 36 permits produced fluid to flow from the production valve assembly 31, through the outlets 36, and up through the annulus 38 to the surface of the ground. A packer apparatus 40 maintains the shoe supported downhole in the borehole and prevents mixing of formation fluid from perforations 42 with the produced fluid at 32 and 38.

In FIGS. 2–5, the seal assembly of the present invention is seen a before mentioned connector body, which preferably includes an upper fastener means 44 in the form of a threaded male surface, and a lower fastener means 46 in the form of a female threaded surface. Groove 48 circumferentially extends 360° about the connector body and within the before mentioned boss. The groove is arranged perpendicular to the axial centerline of the connector. A plurality of ports 50 connect the groove to a source of power fluid at 20.

The groove outwardly opens and includes a bottom 52 connected to opposed sidewalls 54 and 56. A seal means 58 is comprised of a resilient seal element which is received in close tolerance relationship within the groove.

As best seen in FIGS. 4–7, the resilient seal has an inner face or wall 66 spaced from an outer face or wall 68, and further includes opposed sidewalls 70 and 72 which sealingly engage the before mentioned groove walls 54 and 56 in close tolerance, slidable relationship therewith.

Figure 4:
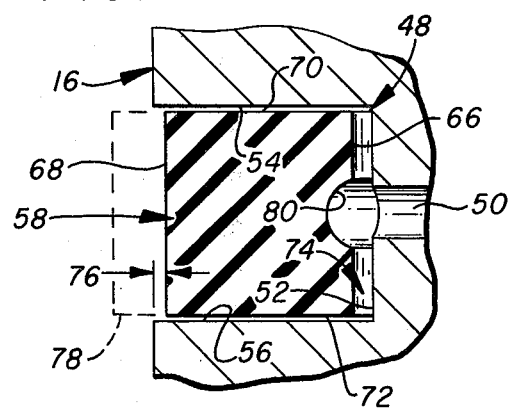
FIG. 4 is a fragmented, enlarged, cross-sectional view of part of the apparatus disclosed in FIG. 2.
Figure 5:
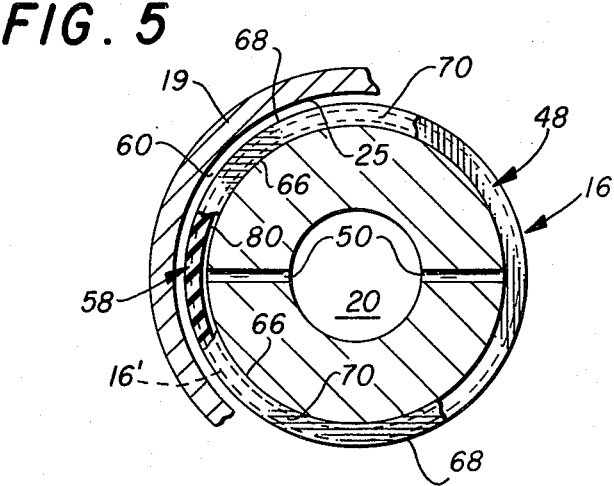
FIG. 5 is a fragmented, cross-sectional view of part of the apparatus disclosed in FIGS. 2 and 3.

The seal inner wall 66 and groove bottom 52 cooperates with the groove sidewalls 54 and 56 to provide the illustrated working chamber 74. When the resilient seal is retracted into the groove, a space 76 occurs between the outer face 68 of the seal and the outer surface of the connector body. As illustrated in FIGS. 4 and 5, when the resilient seal is expanded into engagement with the collar of the lower pump cavity, the resilient seal extends into a position as noted by the dot-dash line at 78, whereupon the seal engages the collar interior with a force which is proportional to the pressure differential provided across the seal element.

Figure 2:
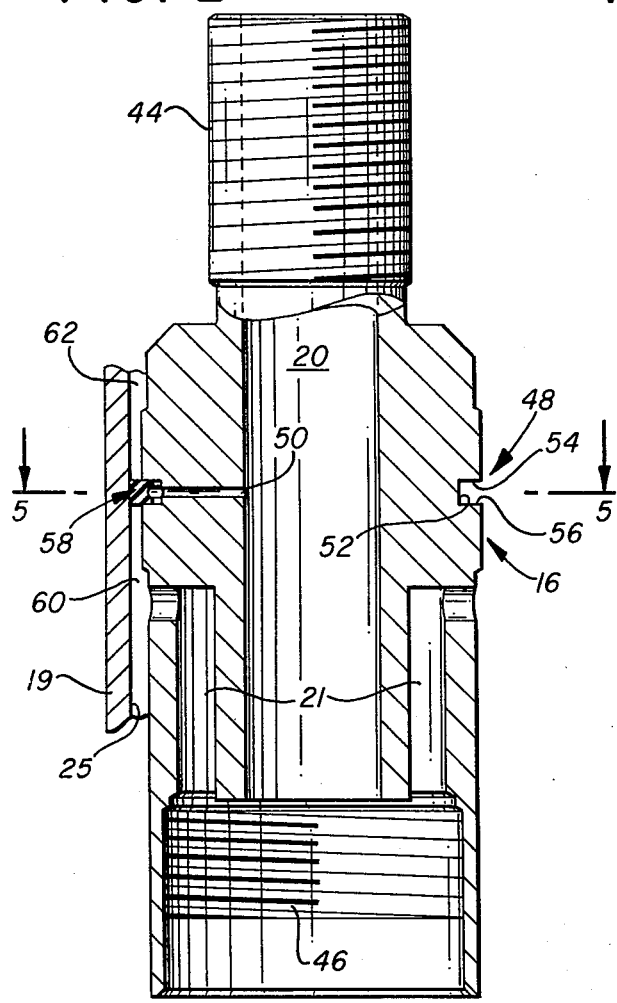
FIG. 2 is an enlarged, longitudinal, part cross-sectional view of part of the combination disclosed in the foregoing figure; with the apparatus on the left hand side of the figure being in its operating configuration.
Figure 3:
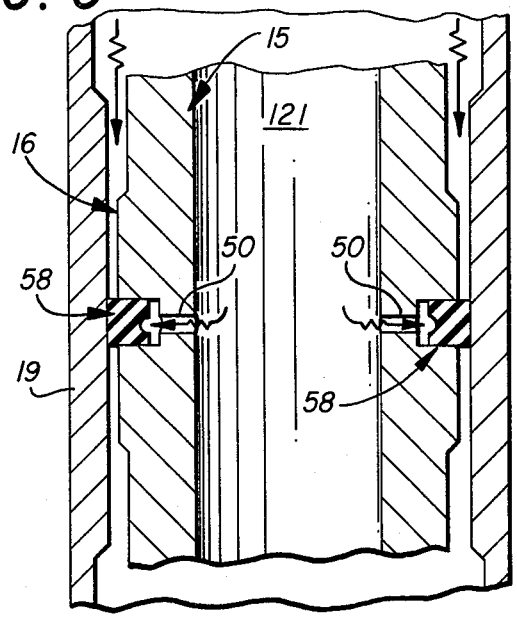
FIG. 3 is a broken, cross-sectional view of a modification of the apparatus of FIG. 2.

It will be noted that FIG. 3 sets forth a modification of the apparatus disclosed in FIGS. 1 and 2, wherein the ports 50 directly connect the longitudinal passageway 121 with the working chamber of the seal assembly.

Figure 6:
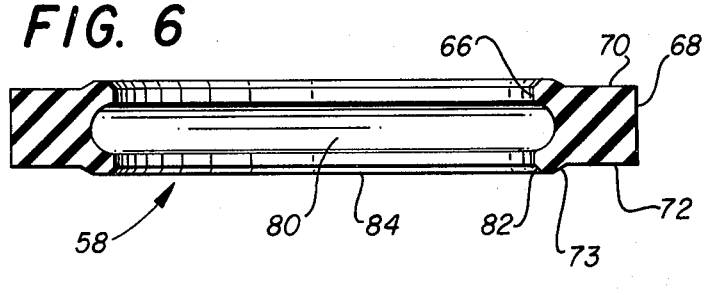
FIG. 6 is a cross-sectional view which sets forth the details of part of the present invention; and, FIG. 7 is a partial cross-sectional view of a modification of FIG. 6.
Figure 7:
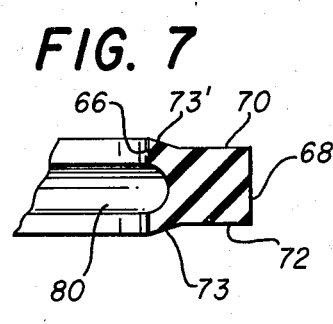

A comparison of FIGS. 6 and 7 with FIGS. 1, 2, and 4 illustrate that the seal element 58 is distorted into a quadrilateral configuration. In FIGS. 6 and 7, the numeral 80 indicates an inwardly directed channel formed on the inner face of the resilient seal element, and which extends circumferentially about the entire seal. The channel forms part of the working chamber of the seal assembly, and biases the seal walls 70 and 72 into tight engagement with the groove walls 54 and 56. The resilient seal includes opposed sides which are outwardly tapered at 73 and at 82 to enhance assembly of the seal element within the groove. Therefore, the medial portion 84 of the seal is thicker than the outer marginal portion at 70 and 72 of the unassembled seal element. Each of the seals disclosed herein are considered to be a quadrangle in cross-sectional configuration.

In operation, a downhole pump such as set forth in U.S. Pat. No. 4,088,328, for example, is attached to a packer nose assembly by means of the connector apparatus of the present invention. The pump is circulated downhole until the lower end thereof becomes seated on a seating shoe, whereupon power fluid is then applied to the power tubing string 19. This causes power fluid to flow into the axial passageway of the packer nose assembly, through the axial passageway of the connector device of the present invention, and to the valve assembly of the engine, whereupon the engine piston reciprocates the pump piston and causes formation fluid at 42 to flow into production valve assembly 31, back through the production ports 36, and up the casing annulus 38 to the surface of the ground. Spent power fluid is mixed with the production fluid and flows therewith.

As the power fluid pressure is first effected within passageway 20, the pressure is also effected through the radially spaced passageways 21, thereby providing each of the groove ports 50 with a source of power fluid. This effects an increased pressure within working chamber 74, and since a pressure differential is effected across the entire inner face of the resilient seal, the seal is forced to expand from the position seen illustrated in FIG. 4 at 58 into the dot-dash position seen illustrated at 78. This is also illustrated in FIGS. 2, 3, and 5.

This action seals the annular area between the pump housing and the collar so that fluid cannot flow thereacross. At the same time, this action of the seal assembly centralizes the upper end of the pump assembly respective to the pump cavity. Moreover, the entire pump assembly is securely supported in fixed relationship downhole in the borehole so that the metal parts of the pump do not touch the metal part of the pump cavity, thereby avoiding abrasive wear of the downhole equipment. Furthermore, where the borehole is slanted, excessive wear on the seal is avoided.

Another important aspect of the present invention is in the retracted and extended positions of the resilient seal element respective to the outer surface of the connector device. As the power fluid pressure is diminished, the memory of the resilient seal element forces the seal to retract back into the groove where it is protected against abrasion as the pump assembly is circulated into and out of the borehole. This is a very important feature of the present invention because the seals are protected and arrive downhole in good working condition, whereas with prior art o-rings and the like, the seals extend beyond the o-ring grooves and are often worn away during the travel to the bottom of the borehole. This undesirable wear often goes undetected until the pump is returned uphole, and it is never known whether the damage to the o-rings occurred prior to or after the use of the pump. Where the seals of a pump have been damaged and the pump has been seated downhole in the borehole for several months, the loss in efficiency due to power fluid flow across the damaged seals can be considerable.

I claim:
1. In a free-type downhole hydraulically actuated pump apparatus which is sealingly received within a collar located downhole in a borehole, a packer nose assembly located at the upper end of a housing of the pump apparatus, the combination with said pump apparatus and collar of a seal assembly which seals the annular area between the pump housing and the collar comprising:

a connector body affixed to the pump housing and having a outer surface which is telescopingly received within the collar, a longitudinal extending passageway formed through the interior of said connector body through which power fluid can flow to an engine of the pump apparatus;

said connector body includes fastener means at each extremity thereof, one fastener means is adapted to be connected to the upper end of the pump apparatus, the other fastener means is adapted to be connected to the packer nose assembly, said packer nose assembly has an axial passageway which is in communication with the passageway of the connector body at one end thereof and which has an opposed end opened for flow of power fluid thereinto;

a circumferentially extending outwardly opening seal receiving groove formed 360° about said connector body, said groove includes a bottom and opposed sidewalls, means forming a flow port from said longitudinally extending passageway to said groove to provide power fluid pressure at the bottom of said groove;

an annular resilient seal element having spaced sidewalls of a dimension to be received in close tolerance relationship within said groove, said resilient seal element having an inner circumferentially extending face spaced from an outer circumferentially extending face; said inner face is disposed adjacent to the bottom of the groove to thereby form a working chamber therebetween; said outer face is inwardly positioned respective to the outer surface of the connector body, and moves radially outwardly when fluid flows into said working chamber;

said connector body includes a plurality of longitudinally extending counterbores radially spaced about and parallel to said longitudinally extending passageway, means by which the lower end of each said counterbore is in fluid communication with said longitudinally extending passageway; said flow port having one end in communication with said longitudinal counterbore and the other end in fluid communication with said working chamber;

whereby, when the pump apparatus is seated downhole in a borehole and fluid pressure is applied to the pump apparatus, pressure is effected in said working chamber to bias the resilient seal element outwardly against the inner peripheral surface of the collar, whereupon the annular area between the pump apparatus and collar is sealed against flow therethrough; and, when the fluid pressure is reduced, the resilient seal element relaxes into a retracted position respective to the groove, and the outer face of the resilient seal element moves radially inwardly away from the inner peripheral surface of the collar, where the seal element is protected from abrasion when the pump apparatus is returned uphole.

2. In a free-type downhole hydraulically actuated pump having a packer nose assembly by which the pump can be circulated downhole through a tubing string into seated position respective to a pump seat, and wherein the pump is telescopingly received in sealed relationship within a pump cavity, so that power fluid can flow down the tubing string and into the pump, while production fluid and spent power fluid is returned uphole by means of the casing annulus, the improvement comprising:

a hollow connector body having means at one end thereof for connection to the pump, and means at the opposed end thereof for connection to the packer nose assembly so that power fluid can flow through the packer nose assembly, through the hollow connector body, and to the pump;

said connector body having a circumferentially extending, outwardly opening, endless groove formed about the outer surface thereof and lying in a plane which is perpendicular to the longitudinal axial centerline of the connector body; said groove being defined by a bottom connected to opposed sidewalls;

a resilient seal means of annular configuration sealingly received in close tolerance relationship within said groove, said seal means includes sidewalls which sealingly engage the groove sidewalls, said seal means includes an outer face and an inner face;

said inner face of the seal means cooperates with the groove bottom and sidewalls to form a working chamber; and means connecting said working chamber to the interior of the hollow connector body;

said outer face being spaced inwardly from the outermost end of the groove wall when the pressure differential across the seal means is relatively low, and being spaced outwardly from the outermost end of the groove wall when the pressure differential thereacross is relatively high;

said connector body includes an axial passageway formed therethrough, through which power fluid can flow;

said collar having an inside peripheral length which extends a longitudinal distance to provide a surface against which the resilient seal can be seated; said resilient seal includes an inwardly opening circumferentially extending annular area which cooperates with the groove bottom to form said working chamber;

said connector body includes a plurality of longitudinally extending counterbores radially spaced about and parallel to said axial passageway, the lower end of said counterbore being in fluid communication with said axial passageway; said flow port having one end in communication with said axial passageway and the other end in fluid communication with said working chamber;

so that when power fluid flows to the pump, the seal means is forced to move radially outward into engagement with the interior surface of the pump cavity, thereby preventing flow of power fluid between the pump exterior and the pump cavity.

3. In a free-type downhole hydraulically actuated pump having a packer nose assembly by which the pump can be circulated downhole through a tubing string into seated position respective to a pump seat, and wherein the pump is telescopingly received in sealed relationship within a pump cavity, so that power fluid can flow down the tubing string and into the pump, while production fluid and spent power fluid is returned uphole by means of the casing annulus, the improvement comprising:

a hollow connector body having means at one end thereof for connection to the pump, and means at the opposed end thereof for connection to the packer nose assembly so that power fluid can flow through the packer nose assembly, through the hollow connector body, and to the pump;

said connector body having a circumferentially extending, outwardly opening, endless groove formed about the outer surface thereof and lying in a plane which is perpendicular to the longitudinal axial centerline of the connector body; said groove being defined by a bottom which is connected to opposed sidewalls;

a resilient seal means of annular configuration sealingly received in close tolerance relationship within said groove, said seal means includes sidewalls which sealingly engage the groove sidewalls, said seal means includes an outer face and an inner face;

said inner face of the seal means cooperates with the groove bottom and sidewalls to form a working chamber; and means connecting said working chamber to the interior of the hollow connector body;

said outer face being spaced inwardly from the outermost end of the groove sidewalls when the pressure differential across the seal means is relatively low, and being spaced outwardly from the outermost end of the groove sidewalls when the pressure differential thereacross is relatively high;

said connector body includes a plurality of longitudinally extending counterbores radially spaced about and parallel to the longitudinal central axis of the hollow connector body; the lower end of said counterbore being in fluid communication with said hollow connector body; said means connecting said working chamber includes a flow port having one end in communication with said longitudinal counterbore and the other end in fluid communication with said working chamber;

so that when power fluid flows to the pump, the seal means is forced to move radially outward into engagement with the interior surface of the pump cavity, thereby preventing flow of power fluid between the pump exterior and the pump cavity.

4. The improvement of claim 3 wherein said resilient seal includes an inwardly opening, circumferentially extending annular area which cooperates with the groove bottom to form said working chamber.

5. In a free-type downhole hydraulically actuated pump apparatus which is sealingly received within a collar located downhole in a borehole, the combination with said pump apparatus and collar of a seal assembly which seals the annular area formed between the pump housing and the collar comprising:

a connector body affixed to the pump apparatus and having an outer surface which is telescopingly received within the collar, a longitudinal extending passageway formed through the interior of said connector body through which power fluid can flow to the engine of the pump apparatus;

a circumferentially extending outwardly opening seal receiving groove formed 360° about said connector body, said groove includes a bottom and opposed sidewalls, means including a radial passageway connected from the groove bottom to the longitudinal passageway, said radial passageway forms a flow port from said longitudinal passageway to said groove to provide fluid pressure at the bottom of said groove;

an annular resilient seal element having spaced sidewalls of a dimension to be received in close tolerance relationship within said groove, said resilient seal element having an inner circumferentially extending face spaced from an outer circumferentially extending face; said inner face is disposed adjacent to the bottom of the groove to thereby form a working chamber therebetween; said outer face is inwardly positioned respective to the outer surface of the connector body and moves radially outwardly when fluid flows into said working chamber;

said resilient seal element has a marginal outer annular portion of constant cross-section and a marginal inner annular portion which diverges in opposite directions to provide a close tolerance fit with respect to the groove;

the inside peripheral wall surface of said collar extends a longitudinal distance to provide a surface against which the resilient seal can be seated;

whereby, when the pump apparatus is seated downhole in a borehole and fluid pressure is applied to the pump apparatus, pressure is effected in said working chamber to bias the resilient seal element outwardly against the inner peripheral surface of the collar, whereupon the annular area between the pump apparatus and collar is sealed against flow therethrough; and, when the fluid pressure is reduced, the resilient seal element relaxes into a retracted position respective to the groove, and the outer face of the resilient seal element moves radially inwardly away from the inner peripheral surface of the collar, where the seal element is protected from abrasion when the pump apparatus is returned uphole.

6. The combination of claim 5 wherein said resilient seal element includes an inwardly opening circumferentially extending annular area which cooperates with the groove bottom to form said working chamber.

7. The combination of claim 5 wherein said pump apparatus includes a pump housing, a packer nose assembly; said connector body includes fastener means at each extremity thereof, one fastener means is adapted to be connected to the upper end of the pump housing, the other fastener means is adapted to be connected to the packer nose assembly, said packer nose assembly having an axial passageway which is in communication with the passageway of the connector body at one end thereof and which has an opposed end opened for flow of power fluid thereinto.

8. The combination of claim 7 wherein said connector body includes a plurality of longitudinally extending counterbores radially spaced about and parallel to said longitudinal axial passageway, the lower end of each said counterbore being in fluid communication with said longitudinal axial passageway; said flow port having one end in communication with said longitudinal counterbore and the other end in fluid communication with said working chamber.

* * * * *

UNITED STATES PATENT AND TRADEMARK OFFICE
CERTIFICATE OF CORRECTION

PATENT NO. : 4,403,922
DATED : September 13, 1983
INVENTOR(S) : GEORGE K. ROEDER It is certified that error appears in the above—identified patent and that said Letters Patent is hereby corrected as shown below:

Column 10, lines 19 and 21, delete "longitudinal" before axial.

Signed and Sealed this

Twenty-second Day of November 1983

[SEAL]

Attest:

GERALD J. MOSSINGHOFF

Attesting Officer   Commissioner of Patents and Trademarks